C. J. PAULSON.
CHANGE SPEED GEAR.
APPLICATION FILED FEB. 8, 1912.
1,035,040.
Patented Aug. 6, 1912.
2 SHEETS—SHEET 2.
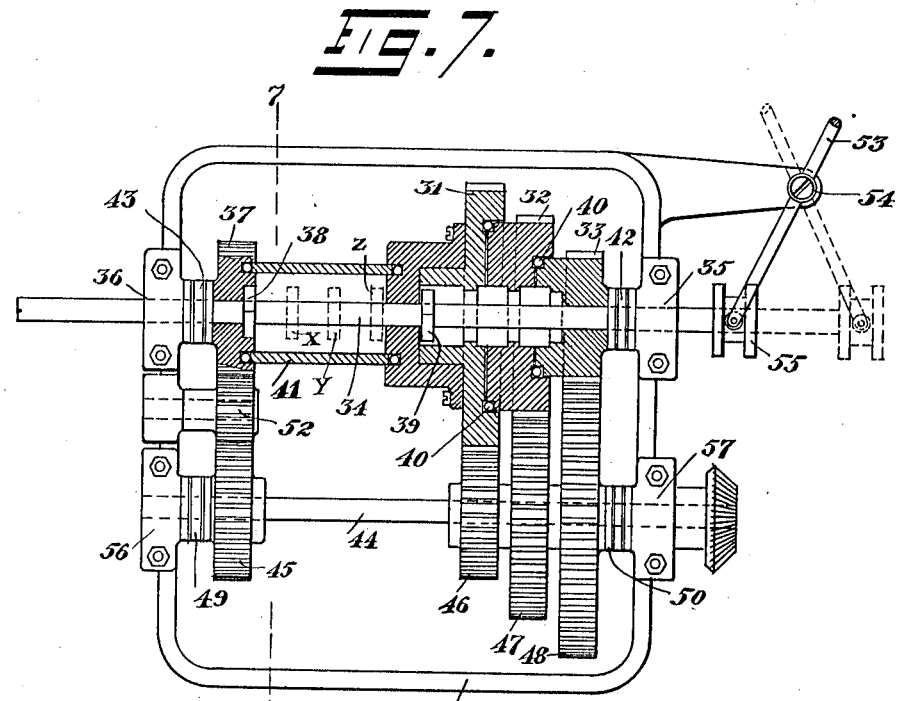
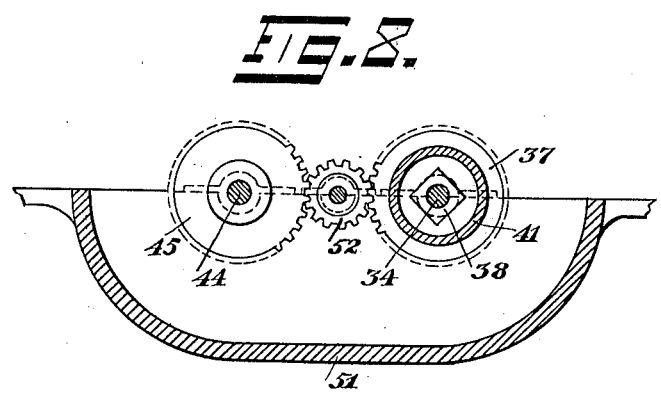

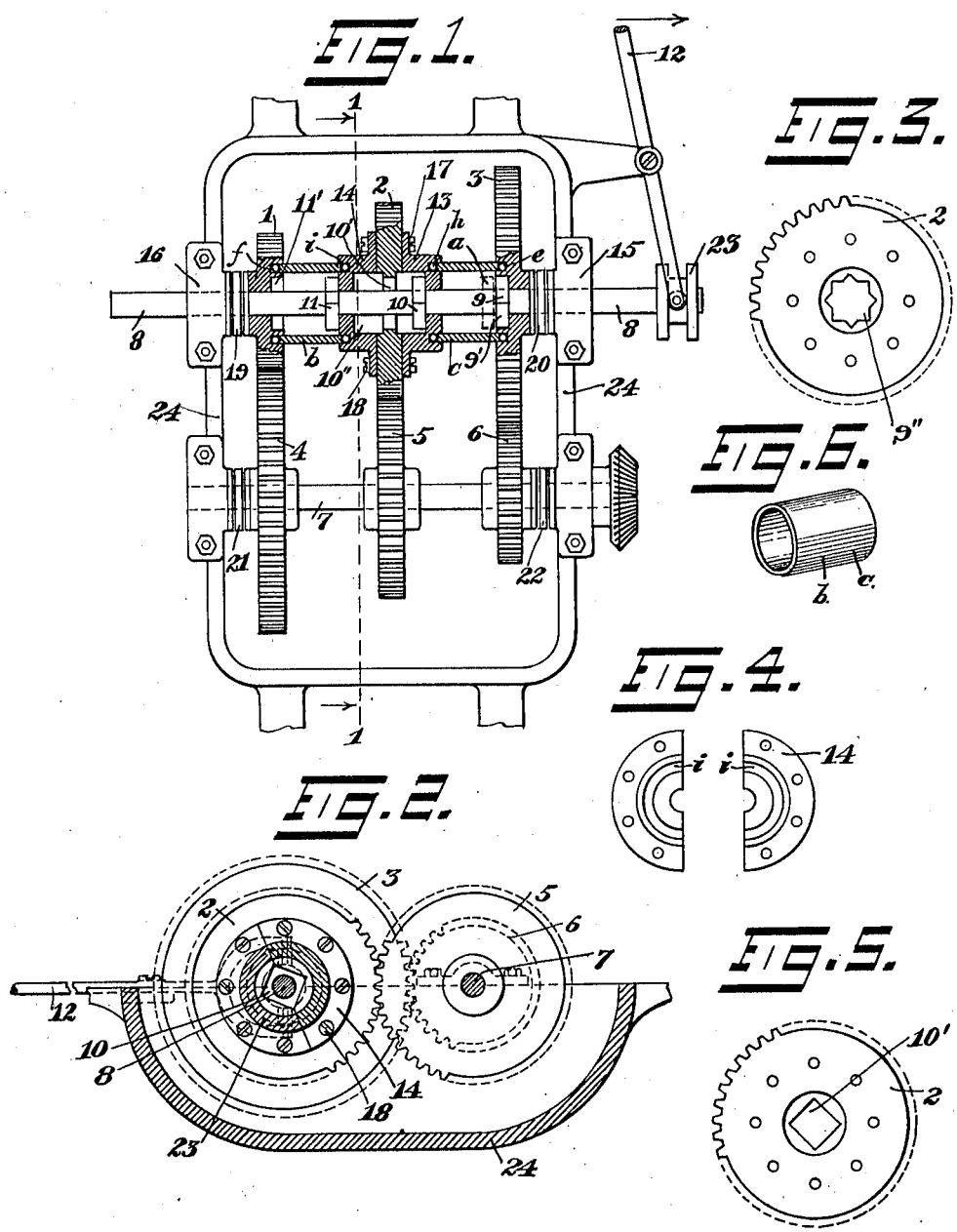

UNITED STATES PATENT OFFICE.

CHARLES J. PAULSON, OF BROOKLYN, NEW YORK, ASSIGNOR TO ALBERT J. NOTHACKER, OF BROOKLYN, NEW YORK.

CHANGE-SPEED GEAR.

1,035,040.  Specification of Letters Patent.  Patented Aug. 6, 1912.

Application filed February 8, 1912. Serial No. 676,216.

*To all whom it may concern:*

Be it known that I, CHARLES J. PAULSON, a subject of the King of Sweden, residing in Brooklyn, county of Kings, and State of New York, have invented certain new and useful Improvements in Change-Speed Gears, of which the following is a specification.

My present invention relates to an improvement in progressive change speed gears for use in power transmission in machines or vehicles, or where such type of speed change mechanism is required.

One of the advantages of this improvement is that the gears, drivers and driven, are always in mesh, thus obviating the clashing of teeth characteristic of the well known types, wherein the gears are shifted from one position to another for rotative engagement. Another advantage is that owing to the method of engaging and locking the desired gears together, harmful effects to the teeth are prevented, the shock of engagement being transmitted through a plurality of teeth and being absorbed by the full breadth or contacting area thereof.

In the accompanying drawings, Figure 1 is a plan view of my device with the upper cover removed and shown partly in section. Fig. 2 is a sectional view taken on line 1—1, Fig. 1. Fig. 3 is a view of one of the driven gears showing a modification. Fig. 4 is a view in elevation of one of the co-acting parts. Fig. 5 is a view of another driven gear in its preferred form. In Fig. 6 is shown, in perspective, one of the separating cylinders. Fig. 7 is a modification of my device shown in Fig. 1. Fig. 8 is a sectional view of my device taken on the line 7—7, Fig. 7.

In Fig. 1 the gear members 1, 2, 3, 4, 5, and 6, are shown as being in engagement with one another, the driving members 4, 5, and 6 being fixedly mounted on driving shaft 7, and the driven members 1, 2, and 3 being freely mounted upon the shifting shaft 8.

The shifting shaft 8 has arranged thereon a plurality of rectangular driving members 9, 10, and 11. These driving members may be integrally formed on the said shifting shaft 8, and are so spaced apart that when the shaft is in the position shown in Fig. 1, the square dog 9 is in a recess 9' which is arranged in the said gear 3, the said recess having a shape similar to that shown in Fig. 5, or it may be arranged as shown in Fig. 3, at 9''. It will be noted that when the dog 9 is engaged as described, the two dogs 10 and 11 are in such position that the driven gears 1 and 2 are free to rotate accordingly as the driving gears 4 and 5 effect them, whereas the speed of shifting shaft 8 is directly controlled by the relation of the driving gear to the driven gear 3. When it is required that the shifting shaft 8 be driven at a speed pre-determined by gears 5 and 2, the hand lever 12 is operated in the direction of the arrow causing the dog 9 to leave its recess and advance the dog 10 into engagement with the recess 10' and the driven gear 2. The ratio of speed between the two shafts 7 and 8 would then be directly proportionate to the ratio between the gears 5 and 2. A further advance of the shifting shaft 8 by the before described means, causes dog 9 to change its position and dog 10 will pass through into the chamber 10'' of gear 2, and dog 11 will then pass into and engage in the recess 11' of driven gear 1. The ratio of rotation between shafts 7 and 8 will then be the same as the proportions between the drive gear 4 and drive gear 1, the other driven gears, 2 and 3, being free to rotate on shaft 8 as they are driven by their corresponding drive members 5 and 6.

It is obvious that to reduce speed, the reverse operation of the shifting shaft 8 through the lever 12 will cause the dogs 11, 10, and 9 to successively engage their respective gears until finally the dog 9 becomes finally engaged with its respective gear 3. A mutual position of non-engagement of the gears is provided as indicated by the dotted line *a*, so that when the dog 9 is in said position all of the other dogs are also in neutral position, thereby permitting a free rotation of the driven gears 1, 2, and 3, without any corresponding rotation of the shifting shaft 8.

It will be noted by referring to Fig. 1 that the driven gears 1, 2 and 3 are spaced in their revolving positions by means of a pair of cylindrical separators *b* and *c*, similar to that shown in Fig. 6. The gears 1 and 3 have arranged therein annular grooves $e$ and $f$; these grooves having arranged therein a plurality of balls against which the ends of the said separators bear.

On the middle driven gear 2, there are arranged a pair of chambered collars 13 and 14, one of which is shown more in detail in Fig. 4, and as being split through the center for the purpose of permitting the easy removal or disassembly of the parts when so required. Likewise, the bearings 15 and 16 are of the usual type, being split near the center thereof permitting quick removal of the shifting shaft 8 and its mounted gears. The before mentioned split collars 13 and 14 are attached to the driven gear 2 by suitable means, such as a plurality of bolts or screws 17 and 18, and they have arranged in the end thereof annular grooves similar to that described for the driven members 1 and 3. These annular grooves, $h$ and $i$, also have a series of balls arranged therein and the opposite ends of the collars $b$ and $c$ are inset into these grooves, and when the three gears are mounted in the housing or casing 24, as shown, all of the rotating elements of the shifting shaft are held in operative position and alinement.

For the purpose of taking up any possible end thrust and for relieving friction, there is arranged on the outside of the driven members 1 and 3 a pair of thrust ball bearings 19 and 20 of the conventional type. On the driving shaft there are arranged similar thrust bearings 21 and 22.

For the purpose of having a free rotative and operative sliding connection between the shifting shaft 8 and the controlling lever 12, a spool 23 is arranged, this being of the conventional type of connecting means between the two mentioned members.

In Fig. 5 is shown a side view of the gear 2 with an opening 10', which is similar to the openings or recesses 9' and 11' in gears 3 and 1, respectively, and while these openings or recesses may be of substantially rectangular form a modification may also be made, as indicated in Fig. 3, where another rectangular opening is cut one quarter way around, thus leaving an opening of substantially star shaped formation, 9''. It is obvious that while in Fig. 5 there are four positions during the rotation of the gear at which the dogs may be caused to engage, in Fig. 3 the positions are doubled thus allowing entry at eight points without materially weakening the engaging faces of the openings or the strength of the gear.

In Fig. 7 is shown a modification of the device shown in Fig. 1, and in many respects is similar with the exception of the reverse gear being arranged therein. A plurality of gears 31, 32 and 33 are arranged upon a slidable shaft 34, said shaft being mounted also for rotation in the bearings 35 and 36 at either end thereof, and an additional gear 37 is mounted at the opposite end of the first said gears and like them is so arranged as to permit the shaft 34 to slidably move therethrough. A dog member 38 is shown as being in engagement with the said gear 37, which is the reverse gear, the said dog being of a similar type as disclosed at 9, 10, and 11, in Fig. 1. A second dog member 39 is arranged so as to operate through the interior of the gears 31, 32 and 33, and when the dog 38 is in a dotted position shown at X, the dog 39 will be in engagement with the gear 31, and when the dog is shifted again to position Y from X the dog 39 will be in engagement with the gear 32; and again when the dog 38 has been moved to the position Z, the dog 39 is in engagement with gear 33. The three gears 31, 32, and 33 are so mounted as to have roller or ball bearing mountings therebetween, similar to that indicated at 40. A separator 41 separates said gears 31, 32 and 33 from the reverse gear, and ball thrust bearing members 42 and 43 are placed at opposite ends of the said shift gear members for the same purposes in the same positions as those described for 19 and 20 in Fig. 1. A second shaft 44 is mounted parallel to the first shaft 34, and has mounted thereon a plurality of gears 45, 46, 47, and 48. The last three of said gears perform the same function as those described for gears 4, 5, and 6, Fig. 1, and are fixedly mounted upon said shaft 44 and rotatable therewith, the said shaft 44 being fixedly mounted longitudinally but free to rotate. The reverse gear 45 is arranged in opposition to the said gears 46, 47, and 48, and is also fixedly attached to the shaft 44. Ball thrust bearings 49 and 50 are also arranged on the shaft and between the gears and bearings 56 and 57. All of the mechanism is held in operative engagement and position and is mounted in the housing 51, the same having arranged thereon suitable support bearings for the entire mechanism. An intermediate or idle gear 52 is mounted upon the said housing at one side thereof and so arranged as to rotate between gears 37 and 45; and when the said shaft 44 is caused to rotate, the gear 37 is rotated in a direction opposite to its mate members 31, 32, and 33. A shifting lever 53, shown as suitably mounted at a pivotal point 54, is arranged to engage in a collar 55 attached to one end of the shaft 34, thereby affording means for shifting the shaft 34 similar to that described for Fig. 1.

Having thus described my invention, I claim:

1. In a change speed gearing, the combination of a sliding shaft, a set of gears rotatable on the shaft, an engaging member on the shaft having a series of projections thereon, each of the gears having in the wall of their bore depressions arranged to receive the projections on the shaft as the same is slid along, said depressions being a multiple of the said projections whereby the gears can be engaged by the shaft in different positions to be actuated by the shaft.

2. In a change speed gearing, the combination of a shaft, a gear having a bore and engaging the shaft to be rotated thereon, a second gear member having a bore and engaging the shaft to be rotatable thereon, and a third gear member positioned intermediate of said gears with its bore larger than and free from said shaft, said intermediate gear being rotatably supported by the said other gears.

3. In a change speed gearing, the combination of a shaft, a gear having a bore and engaging the shaft to be rotatable thereon, a second gear member having a bore and engaging the shaft to be rotatable thereon, and a third gear member positioned intermediate of said gears with its bore larger than and free from said shaft, said intermediate gear being rotatably supported by the said other gears, said shaft having an engaging member, and said gears having abutment portions in their bores arranged to be engaged alternately by said projection upon endwise movement of the shaft whereby either one of the gears can be independently engaged with the shaft to be rotatable therewith.

4. In a change speed gearing, the combination of a shaft, a gear having a bore and engaging the shaft to be rotatable thereon, a second gear member having a bore and engaging the shaft to be rotatable thereon, a third gear member positioned intermediate of said gears with its bore larger than and free from said shaft, said intermediate gear being rotatably supported by the said other gears, said shaft having an engaging member, said gears having abutment portions in their bores arranged to be engaged alternately by said projection upon endwise movement of the shaft whereby either one of the gears can be independently engaged with the shaft to be rotatable therewith, a second shaft, three gears fast on the second shaft and in engagement with said three gears respectively to be driven by either one of the latter gears that is engaged by the shaft by said projection, a reversing gear loose on the first mentioned shaft, a reversing gear fast on the second shaft, a connecting gear meshing with two said reversing gears, a second projection on said first mentioned shaft, the reversing gear on said shaft having an abutment portion arranged to be engaged by said latter projection upon endwise movement of the shaft in which the said three gears are out of connection with the said first mentioned projection, whereby the second shaft will be rotated in a direction the reverse to that rotated by either of the said first mentioned gears.

5. In a change speed gearing, the combination of a shaft, a gear having a bore and engaging the shaft to be rotatable thereon, a second gear member having a bore and engaging the shaft to be rotatable thereon, a third gear member positioned intermediate of said gears with its bore larger than and free from said shaft, said intermediate gear being rotatably supported by the said other gears, said shaft having an engaging member, said gears having abutment portions in their bores arranged to be engaged alternately by said projection upon endwise movement of the shaft whereby either one of the gears can be independently engaged with the shaft to be rotatable therewith, a second shaft, three gears fast on the second shaft and in engagement with said three gears respectively to be driven by either one of the latter gears that is engaged by the shaft by said projection, a reversing gear loose on the first mentioned shaft, a reversing gear fast on the second shaft, a connecting gear meshing with said two reversing gears, a second projection on said first mentioned shaft, the reversing gear on said shaft having an abutment portion arranged to be engaged by said latter projection upon endwise movement of the shaft in which the said three gears are out of connection with the said first mentioned projection, whereby the second shaft will be rotated in a direction the reverse to that rotated by either of the said first mentioned gears, a thrust bearing on the first mentioned shaft engaging one of said three gear members, a thrust bearing on the opposite portion of the shaft engaging the said reverse gear thereon, and a sleeve member surrounding the said first mentioned shaft and offset therefrom, one of its extremities engaging the reversing gear on said shaft and its other extremity engaging one of said three gears on the shaft to permit free movement of the projection on the shaft for engaging the reversing gear.

6. In a change speed gearing, a shaft, a gear rotatably engaging the shaft and having an annular projection on one side whose bore is off-set from the shaft, a second gear on the shaft having a large bore off-set from the shaft, said second gear having a recessed bore into which projects the extension on said gear, a third gear on the shaft beyond the second gear having a bore surrounding the shaft and off-set therefrom, the third gear having an annular recess in one side into which projects a portion of the second gear, whereby the second gear is supported off-set from the shaft by the said first and third gears, the shaft having a projection thereon slidable in the off-set bore portions of the said three gears, said gears each having abutment portions for engagement respectively with the projection, the third gear having an extension containing a bore and engaging said shaft, a second shaft, three gears fast on the second shaft and engaging said three gears respectively by which the second shaft is rotated when any of said first three gears are engaged by the projection on their supporting shaft.

CHARLES J. PAULSON.

Witnesses:
 A. J. NOTHACKER,
 H. D. PENNEY.

Copies of this patent may be obtained for five cents each, by addressing the "Commissioner of Patents, Washington, D. C."